(12) United States Patent
Osman (10) Patent No.: US 9,465,226 B2
(45) Date of Patent: Oct. 11, 2016

(54) AUTOMATIC SHUTDOWN OF 3D BASED ON GLASSES ORIENTATION

(75) Inventor: Steven Osman, San Francisco, CA (US)

(73) Assignee: SONY COMPUTER ENTERTAINMENT INC., Tokyo (JP)

( * ) Notice: Subject to any disclaimer, the term of this patent is extended or adjusted under 35 U.S.C. 154(b) by 684 days.

(21) Appl. No.: 13/206,122

(22) Filed: Aug. 9, 2011

(65) Prior Publication Data

US 2013/0038520 A1   Feb. 14, 2013

(51) Int. Cl.
G02B 27/22 (2006.01)
G02B 27/00 (2006.01)
G06F 1/32 (2006.01)

(52) U.S. Cl.
CPC ....... G02B 27/2264 (2013.01); G02B 27/0093 (2013.01); G06F 1/3215 (2013.01); G06F 1/3265 (2013.01); Y02B 60/1242 (2013.01)

(58) Field of Classification Search
USPC ................................ 345/156; 359/462–477
See application file for complete search history.

(56) References Cited

U.S. PATENT DOCUMENTS

| | | |
|---|---|---|
| 4,807,202 A | 2/1989 | Cherri et al. |
| 4,884,876 A | 12/1989 | Lipton et al. |
| 4,907,860 A | 3/1990 | Noble |
| 5,805,205 A | 9/1998 | Songer |
| 5,821,989 A | 10/1998 | Lazzaro et al. |
| 6,175,379 B1 | 1/2001 | Uomori et al. |
| 6,198,484 B1 | 3/2001 | Kameyama |
| 6,727,867 B2 | 4/2004 | Divelbiss et al. |
| 8,269,822 B2 * | 9/2012 | Zalewski .................. 348/56 |
| 8,605,140 B2 | 12/2013 | Chiba et al. |
| 2002/0122145 A1 | 9/2002 | Tung |
| 2002/0149613 A1 | 10/2002 | Gutta et al. |
| 2005/0024586 A1 | 2/2005 | Teiwes et al. |
| 2005/0057807 A1 | 3/2005 | Takagi et al. |
| 2005/0094267 A1 | 5/2005 | Huber et al. |
| 2005/0116881 A1 | 6/2005 | Divelbiss et al. |
| 2005/0259323 A1 | 11/2005 | Fukushima et al. |
| 2006/0038880 A1 | 2/2006 | Starkweather et al. |
| 2006/0061652 A1 | 3/2006 | Sato et al. |
| 2007/0236493 A1* | 10/2007 | Horiuchi et al. ............. 345/419 |

(Continued)

FOREIGN PATENT DOCUMENTS

| | | |
|---|---|---|
| CN | 1749808 A | 3/2006 |
| CN | 101840073 A | 9/2010 |

(Continued)

OTHER PUBLICATIONS

Toner, Mark, Dissertation abstract (unsubstantiated, source can not be confirmed, please see attached NPL reference for further details), 2 pages.

Primary Examiner — Kenneth B Lee, Jr.
(74) Attorney, Agent, or Firm — Kilpatrick Townsend & Stockton LLP (57) ABSTRACT

Devices, systems, and methods are presented for shutting down the 3D effect of active shutter 3D glasses by synchronizing the transparency of the lenses with respect to each other when the 3D glasses have been rotated beyond a threshold angle. The threshold angle can be pre-set through a user-selectable switch. Transitioning from an alternating shutter mode to a synchronized shutter mode can include a fade in which the duty cycles of the lens are adjusted. Direct measurement techniques for measuring the differential roll angle between the lenses and left and right eye images on a display are disclosed.

20 Claims, 10 Drawing Sheets

(56) References Cited

U.S. PATENT DOCUMENTS

| | | |
|---|---|---|
| 2008/0062259 A1 | 3/2008 | Lipton et al. |
| 2008/0084513 A1 | 4/2008 | Brott et al. |
| 2008/0100547 A1 | 5/2008 | Cernasov |
| 2010/0007582 A1 | 1/2010 | Zalewski |
| 2010/0171697 A1 | 7/2010 | Son et al. |
| 2010/0177174 A1* | 7/2010 | Ko et al. .................. 348/56 |
| 2010/0238097 A1 | 9/2010 | Baik et al. |
| 2011/0032365 A1 | 2/2011 | Yett |
| 2011/0149054 A1* | 6/2011 | Yun et al. ................ 348/58 |
| 2011/0216175 A1* | 9/2011 | Shimoyama et al. ...... 348/56 |
| 2011/0234774 A1* | 9/2011 | Satoh et al. .............. 348/56 |
| 2012/0038635 A1 | 2/2012 | Stamate et al. |
| 2013/0002839 A1* | 1/2013 | Pennisi et al. ............ 348/58 |

FOREIGN PATENT DOCUMENTS

| | | |
|---|---|---|
| CN | 101995669 A | 3/2011 |
| CN | 103037233 A | 4/2013 |
| DE | 19533767 A1 | 3/1997 |
| JP | 9135400 A | 5/1997 |
| WO | 02/15595 A1 | 2/2002 |
| WO | PCT/US2010/045078 | 8/2010 |
| WO | 2011/083435 A1 | 7/2011 |
| WO | 2012/021129 A1 | 2/2012 |

* cited by examiner

AUTOMATIC SHUTDOWN OF 3D BASED ON GLASSES ORIENTATION

CROSS-REFERENCES TO RELATED APPLICATIONS

This application is related to, but not a continuing application of, International Application No. PCT/US2010/045078, filed Aug. 10, 2010, and U.S. application Ser. No. 13/214,918, filed Aug. 22, 2011, which are hereby incorporated by reference in their entirety for all purposes.

BACKGROUND

1. Field of the Art

Embodiments of the present invention relate to three dimensional ("3D" or "3-D") image rendering and three dimensional image displays using active-shutter glasses in general and, in particular, to the rendering and display of stereoscopic images at various degrees of roll to compensate for a viewer whose eyes are rotated with respect to images on a display.

2. Description of the Related Art

Three dimensional images are typically displayed to viewers through the process of stereoscopy, where a different perspective of an object or scene is presented to each eye of the viewer. This pair of stereoscopic images is seen by the eyes and combined in vision processing to create the illusion of depth. The general idea can be captured by the example of three dimensional glasses with red and blue lenses, where each lens filters out a respective color to present a different image to each eye, which results in the display of a three dimensional image. Other methods include rapidly blocking the vision of one eye while allowing the other eye of a viewer to see an image and then alternating. Active 3D glasses, with liquid crystal display (LCD) lenses that alternate between opaque and transparent states, are often used for this technique. Autostereoscopic techniques exist to present different images to each eye without the use of glasses.

In prior art implementations, a pair of stereoscopic images displayed to the viewer are presented such that the images as viewed are horizontally adjacent and horizontally separated so as to create an illusion of depth when combined. This horizontal orientation of the images assumes that a viewer is facing the display without any degree of roll in the viewer's eyes with respect to the display, such as if a viewer were laying on his or her side. The horizontal spacing of the pair of stereoscopic images also remains constant, even if there is yaw rotation of the viewer's eyes. Methods and systems for compensating for a rotated view are described in related International Patent Application No. PCT/US2010/045078, filed Aug. 10, 2010, cited above.

Some of the solutions for compensating for roll orientation of a view require a system-level implementation. Because the entire system, both the television and 3D glasses, are involved in the implementation, the possibility of incompatibilities between the television and 3D glasses is present. An additional problem with entire-system-level methods for implementations is that tying the solution to both a television and 3D glasses involves the expense of altering both.

There is a need in the art for less expensive 3D technologies that are available to a mass consumer market

BRIEF SUMMARY

Devices, systems, and methods are presented for detecting that a viewer wearing 3D glasses has rotated his or her orientation with respect to images on a display and then based on the rotation, fades out or turns off the 3D effect. Turning off the 3D effect can be accomplished by synchronizing the active-shutter lenses of the glasses with each other such that both of the wearer's eyes see only the left eye images or only the right eye images on a 3D display.

In detecting roll orientation, one can in many circumstances assume that a display is placed normally such that gravity is "down" with respect to the display. In this case, a simple sensor in the glasses may be all that is needed to detect roll orientation. For example, if an inclinometer within the frame of 3D glasses detects rotation with respect to gravity, then the glasses can switch off the 3D effect.

In the more general case in which a display is rotated or is not aligned with gravity, such as with a computer monitor that can be swung from portrait to landscape modes, or with displays jostling about in moving vehicles, then more complex methods can be used. For example, a camera on the 3D glasses can detect the orientation of the rectangle of the display with respect to the frame of the glasses.

In yet a more general case, right eye and left eye images on the display can rotate with respect to the display itself. That is, left eye and right eye images are not aligned with respect to the frame bezel of a rectangular display. In this case, content recorded with the images, such as a line connecting points that are aligned with the proper orientation of the right and left eye images, is projected onto the display, and a camera on the 3D glasses tracks the orientation of the line with respect to the glasses frame.

Fading from 3D to non-3D, and solutions for multiple watchers of the same 3D display, are also addressed.

Some embodiments are directed to an apparatus for viewing a stereoscopic display, including a pair of active shutter lenses, each lens enabled to alternate opacity and transparency, a sensor for detecting a roll orientation of the lenses, and a circuit connected with the active shutter lenses, the circuit configured to switch the lenses from alternating opacity with respect to each other to synchronizing opacity with respect to each other based on a signal from the sensor.

The embodiments can include fade logic configured to fade one of the lenses from alternating opacity with respect to the other lens to synchronizing opacity with respect to the other lens. The fade logic can shorten a duty cycle of the faded lens during fading or alter the degree of transparency of the lenses.

Some embodiments are directed to a system for viewing a stereoscopic display, including a pair of active shutter lenses, each lens enabled to alternate opacity and transparency, a system for detecting a differential roll angle of the lenses with respect to an orientation of left eye and right eye images on a display, and a circuit connected to the active shutter lenses, the circuit configured to switch the lenses from alternating opacity with respect to each other to synchronizing opacity with respect to each other based on a signal from the device.

The systems for detecting the roll angle can include a sensor for detecting a roll orientation of the lenses with respect to gravity, a transmitter configured to transmit a signal representing a roll orientation of the left eye and right eye images on the display with respect to gravity, and a receiver configured to receive the signal, the receiver operatively connected with the circuit. The circuit can be configured to determine the differential roll angle by determining a difference between the roll orientation of the lenses with respect to gravity and the received roll orientation of the left eye and right eye images on the display with respect to gravity, thereby mathematically cancelling out a direction of gravity.

Some embodiments are directed to a method for viewing a stereoscopic display. The method includes alternating opacity and transparency in each lens of a pair of active shutter lenses, the lenses alternating opacity with respect to each other, detecting a roll orientation of the lenses, and synchronizing opacity of the lenses with respect to each other based on the roll orientation detection.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Generally, devices, systems, and methods are presented for shutting down the 3D effect of active 3D glasses when they have rotated with respect to left and right eye images on a 3D display. The 3D effect can be shut down by synchronizing both lenses of the 3D glasses so that they are transparent at the same time and then opaque at the same time, or synchronized with respect to each other, such that only left eye images (or right eye images) from the 3D display are shown to the user. The synchronization can occur in response to the glasses being rotated past a threshold angle. The angle can be selected by the wearer of the glasses or based on a determined age of the user. For example, if the glasses detect that the user has a small head, then the angle at which 3D effects shut down can be very small or zero. The shutdown of 3D can be accompanied by a smooth fade from alternation to synchronization or by audio tones, lights, or vibration.

Further embodiments are directed to determining the degree of roll with which to display stereoscopic images when viewed by a plurality of viewers, where each viewer's eyes may have a different roll inclination with respect to the display.

Technical advantages of embodiments are many. A user can lie his or her head down while watching a 3D display, and his or her 3D glasses will help prevent the stereoscopic view from becoming disorienting. Fade logic and delay logic can ensure a smooth transition for further comfort to the user. In some embodiments, all of the logic and functionality can be onboard the glasses with nothing to alter in a television. Thus, new glasses can be sold that are not only compatible with existing displays but have the additional functionality. The added cost to the glasses can be minimal because a miniature, inexpensive sensor, such as a mercury switch can be used, along with some logic coupled to the controller that controls the lenses.

In more complex embodiments, logic and or sensors can be included on the television. For example, if there are multiple viewers of the television, 3D can be switched off on the television side if all viewers are rotated beyond a threshold angle. Displays with rotated left eye and right eye views can include their own presentation and control for 3D glasses to ensure that the glasses shut off the 3D effect when the glasses are rotated with respect to the left eye and right eye images, not just rotated with respect to gravity.

This description provides examples only and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
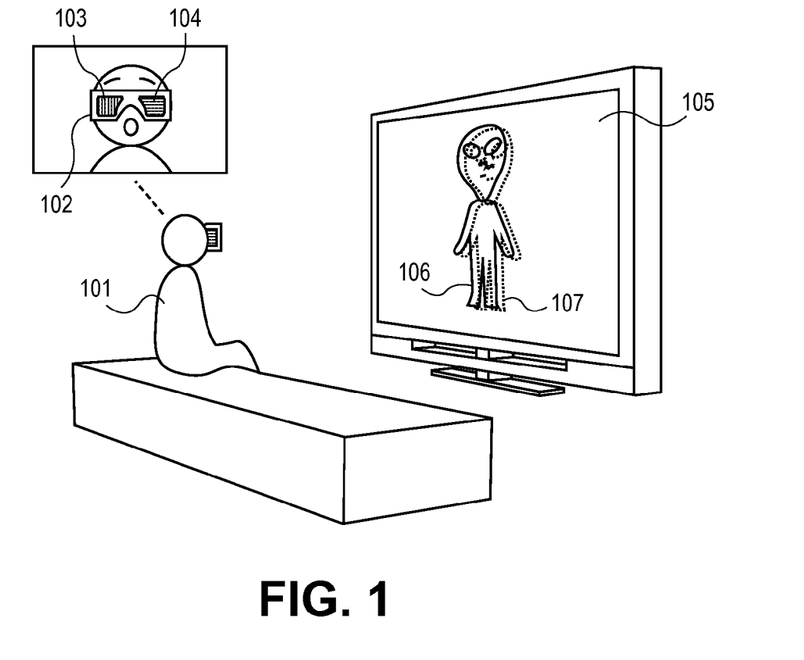
FIG. 1 illustrates a upright viewer of a 3D television in accordance with an embodiment.

FIG. 1 illustrates an upright viewer of a 3D television in accordance with an embodiment. Viewer 101 wears 3D glasses 102 while sitting straight up. 3D glasses 102 have right lens 103 and left lens 104 that each alternate transparency and opacity in rapid succession. The 3D glasses are synchronized to 3D display 105, which alternates showing right eye image 106 and left eye image 107 in rapid succession. Alternating images at 120-240 cycles per second (Hz) is common in such displays. When right eye image 106 is displayed, right lens 103 is transparent and left lens 104 is opaque. When left eye image 107 is displayed, left lens 104 is transparent and right eye lens 103 is opaque. By showing each eye a slightly different camera angle, the system tricks the viewer's brain into interpreting the flat, two dimensional images on the display as appearing in three dimensions before the viewer.

Figure 2:
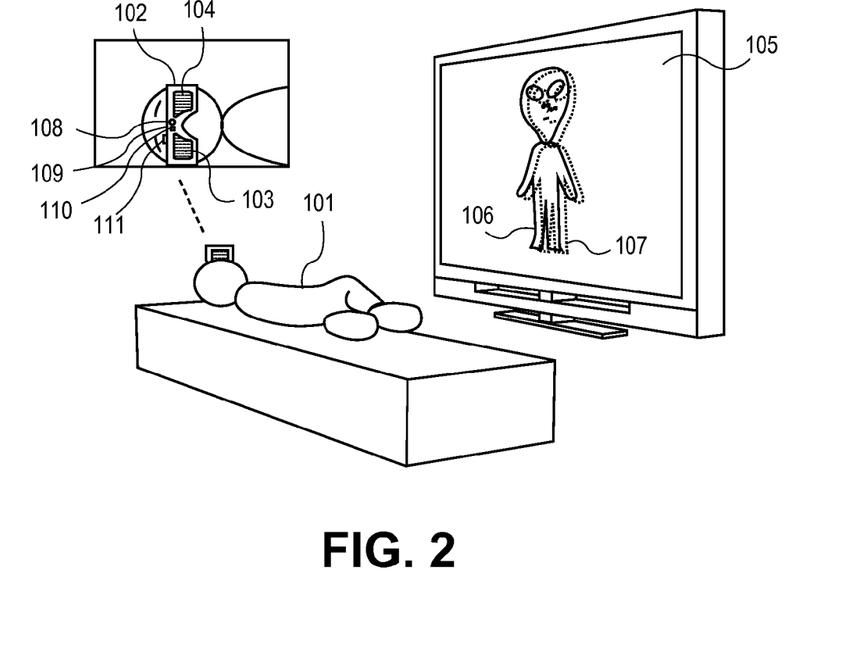
FIG. 2 illustrates a reclined viewer of a 3D television in accordance with an embodiment.

FIG. 2 illustrates a reclined viewer of a 3D television in accordance with an embodiment. Viewer 101 has laid down and has rotated his head such that the glasses he wears are rotated ninety degrees from their conventional orientation. Sensor 108 has detected a roll angle greater than a threshold angle and sent a signal to control circuit 109. Control circuit 109 controls lens transparency and opaqueness of the lenses. In the exemplary embodiment, control circuit 109 switches the lenses from alternating opacity with respect to each other to synchronizing opacity with respect to each other. Thus, when right eye image 106 is displayed, both right lens 103 and left lens 104 are transparent. Both lenses allow right eye image 106 to be seen by the viewer. When left eye image 107 is displayed, both right lens 103 and left lens 104 are opaque. Neither lens allows left eye image 107 to be seen by the viewer. Note that the 3D display still shows alternating right eye and left eye images in rapid succession, but the 3D glasses only allow one of those images to pass through the glasses to the viewer's eyes.

An audio speaker, light emitting diode (LED) light, and/or a small vibration motor can be integrated with 3D glasses 102. They can be activated to indicate when the switch is made from alternating lenses to synchronized lenses or vice versa. For example, the motor can purr for a half of a second to indicate that the switch is made. In the exemplary embodiment, audio speaker 110 gently beeps to notify the user that the glasses have been rolled beyond a threshold angle.

Selector switch 111, which is accessible by the user, can be selected to switch 3D off at certain angles. For example, the selector switch can be set to turn off 3D at 30°, 45°, 60°, or other predetermined angles. The direction of the roll, or sign of the angle, can be disregarded.

When the viewer sits back upright, as in FIG. 1, the process is reversed. That is, control circuit 109 switches the lenses from synchronizing opacity with respect to each other to alternating opacity with respect to each other. The audio speaker, LED light, and/or vibration motor can indicate the switch back.

Figure 3:
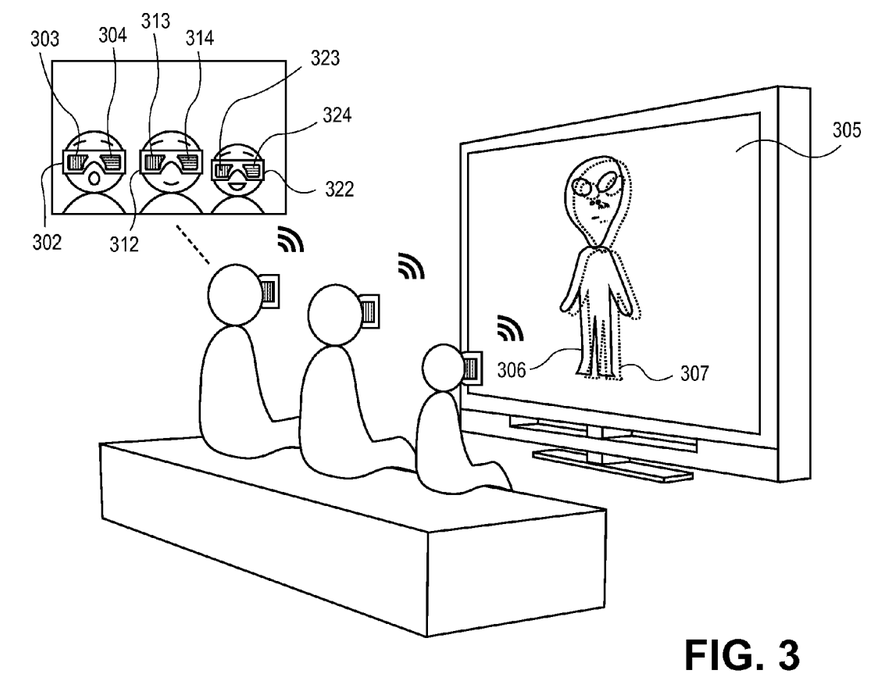
FIG. 3 illustrates multiple upright viewers of a 3D television in accordance with an embodiment.

FIG. 3 illustrates multiple upright viewers of a 3D television in accordance with an embodiment. Three viewers sit upright wearing 3D glasses 302, 312, and 322. 3D glasses 302 have right and left lenses 303 and 304, respectively. 3D glasses 312 have right and left lenses 313 and 314, respectively. 3D glasses 322 have right and left lenses 323 and 324, respectively.

The right and left lenses of each 3D glasses 302, 312, and 322 alternate opacity/transparency. When the right lens is transparent, the left lens is opaque. When the left lens is transparent, the right lens is opaque. The viewers watch television 305, which rapidly alternates showing right eye image 306 and left eye image 307. In the embodiment represented by the figure, all the right lenses are transparent at the same time while the left lenses are opaque, and all the left lenses are transparent at the same time while the right lenses are opaque.

Figure 4:
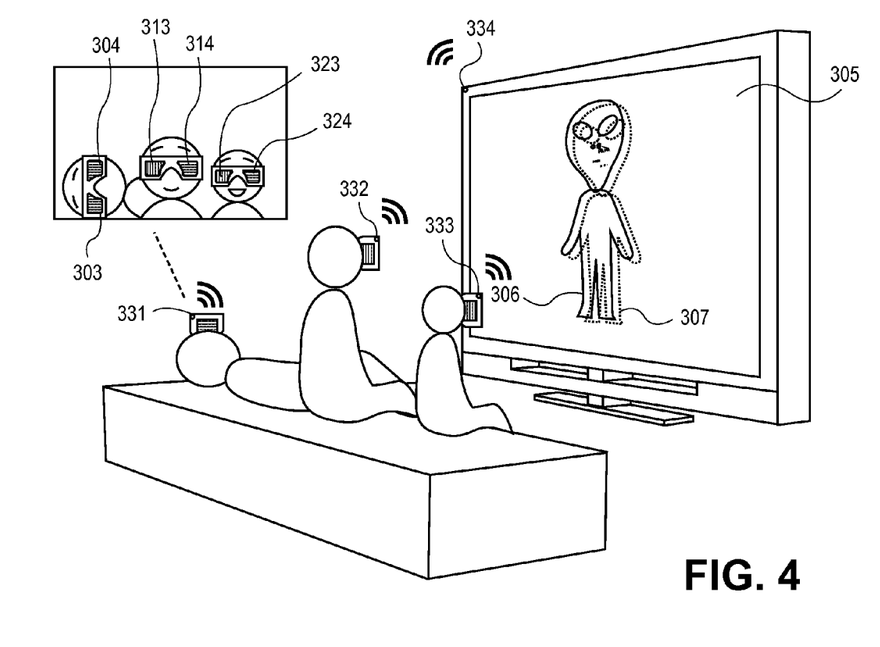
FIG. 4 illustrates upright and reclined viewers of a 3D television in accordance with an embodiment.

FIG. 4 illustrates both upright and reclined viewers of a 3D television in accordance with an embodiment. One of the users reclines so that his 3D glasses are rotated ninety degrees with respect to television 305. Lenses 303 and 304 of his glasses switch from alternating opacity with respect to each other to synchronizing their opacities. Upon this switch, transmitter 331, located on 3D glasses 302 and associated with lenses 303/304, transmits a signal indicating that it is in a rotated mode.

The other two users remain sitting upright. Lenses 313/314 and 323/324 remain at a normal orientation to television 305. The transmitters with which they are associated, transmitters 332 and 333, maintain that they are in a normal orientation.

Based on the situation that there are two 3D glasses in the normal orientation and one in the rotated orientation, television 305 maintains a transmission in normal 3D mode, rapidly alternating the display of right eye and left eye images.

Figure 5:
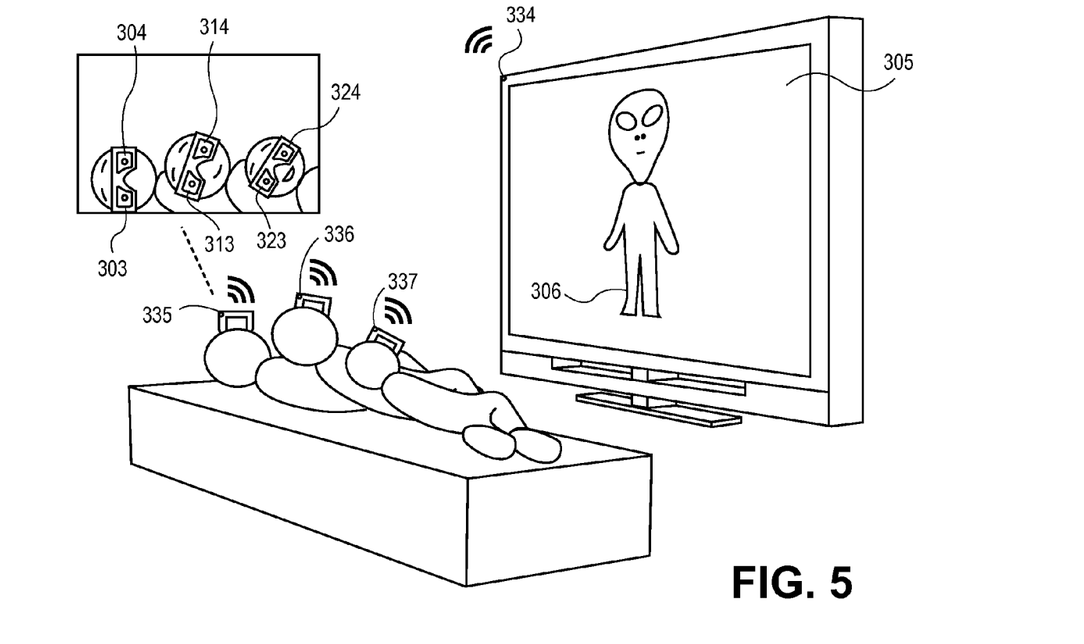
FIG. 5 illustrates multiple reclined viewers of a 3D television in accordance with an embodiment.

FIG. 5 illustrates multiple reclined viewers of a 3D television in accordance with an embodiment. In this figure, all of the users recline so that their 3D glasses are rotated beyond a threshold angle. Lenses 313 and 314 and lenses 323 and 324 switch from alternating opacity with respect to each other to synchronizing their opacities. Upon this switch, transmitters 332 and 333 transmit signals indicating that the glasses are in rotated mode. At this point, all the right and left lenses are transparent at the same time, and all the right and left lenses are opaque at the same time.

Based on the transmissions that there are no 3D glasses in the normal orientation, or that there are more 3D glasses in rotated mode than in upright, normal mode, television 305 broadcasts a signal that its 3D rendering will be turned off. Television 305 then displays only one of the left/right images. In the exemplary embodiment, right eye image 306 is displayed. Television brightness is decreased to make up for the image no longer being time-multiplexed.

Receivers 335, 336, and 337, each associated with their respective 3D glasses and lenses, receive the broadcast signal. In response, their control circuits turn off all opacity, leaving both lenses of each pair of 3D glasses transparent at all times.

A technical advantage with this system is that power can be conserved in the glasses by switching off the opacity and rapid switching in the glasses. Power is conserved in the television by decreasing its brightness. Furthermore, user comfort can be increased for more sensitive viewers by eliminating flickering of the active shutter lenses.

Figure 6:
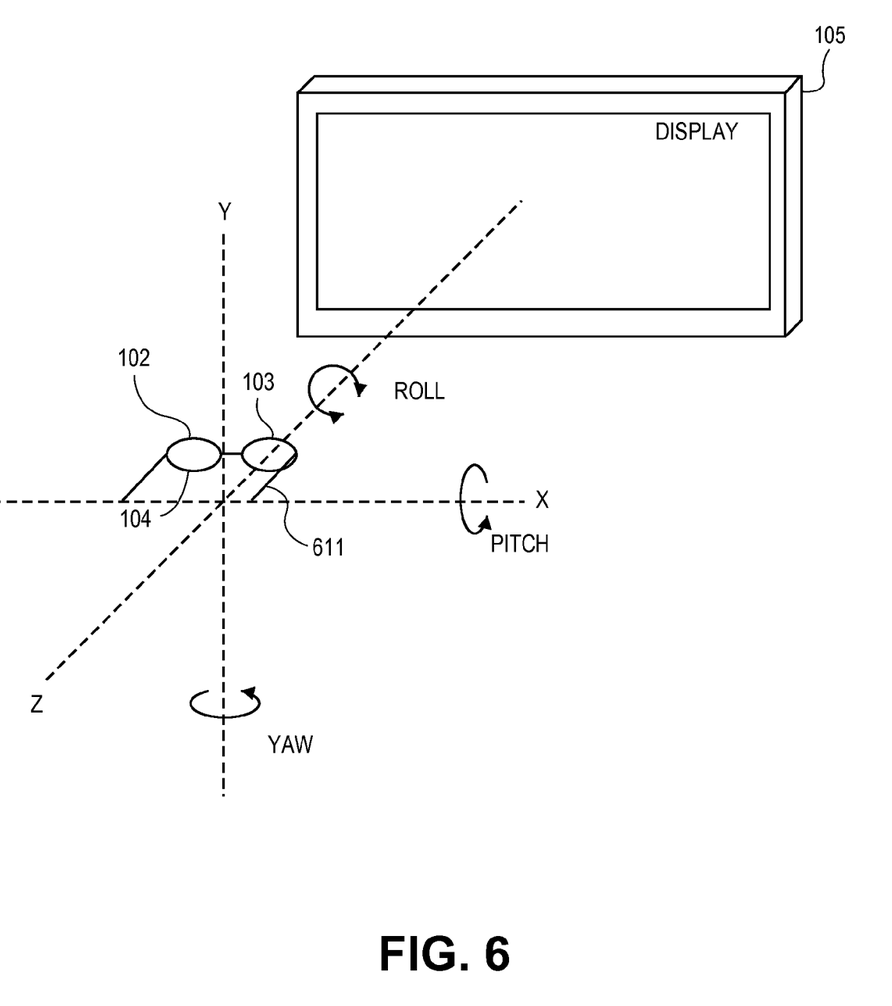
FIG. 6 illustrates pitch, yaw, and roll angles of 3D glasses with respect to a 3D television in accordance with an embodiment.

FIG. 6 illustrates pitch, yaw, and roll angles of 3D glasses with respect to a 3D television in accordance with an embodiment. 3D glasses 102 are shown directly facing and horizontally aligned with respect to a display 105. 3D glasses 102 are drawn as a pair of spectacles to illustrate depth, but may represent other means for aligning lenses with a person's eyes, including pince-nez, monocles, binoculars, contact lenses, helmet visors, free-standing windows and other means. The x, y, and z-axes represent the dimensions in which the lenses 103 and 104 can be inclined with regards to the display 105. Rotation along the z-axis is roll, rotation around the y-axis is yaw, and rotation along the x-axis is pitch. The terms "rotated" and "inclined," and "rotation" and "inclination" may be used interchangeably. Rotation of the lenses with respect to each other can be approximated by the rotation of a frame that connects them together or as otherwise would be apparent to one skilled in the art.

Because display 105 is aligned up and down with respect to gravity, measurements using an inclinometer on the frame of the glasses can determine how much the glasses are rolled. Similarly, a simple mercury switch or non-toxic substitute can be used to determine whether the glasses have rolled past a predetermined threshold angle.

Selector 611 can infer the age of the wearer by measuring the width of the wearer's head. The smaller the head, the more likely that that the wearer is young. Angle sensors and/or stress sensors in the temple hinges can determine how wide a wearer's head is. With a small child, a parent may wish to turn off 3D effects altogether. If the stress sensors detect a small head, then the threshold angle can be set to zero degrees. I.e., both lenses will be synchronized for all angles, thus showing only one of the left or right eye images on the display to a wearer of the glasses.

Figure 7:
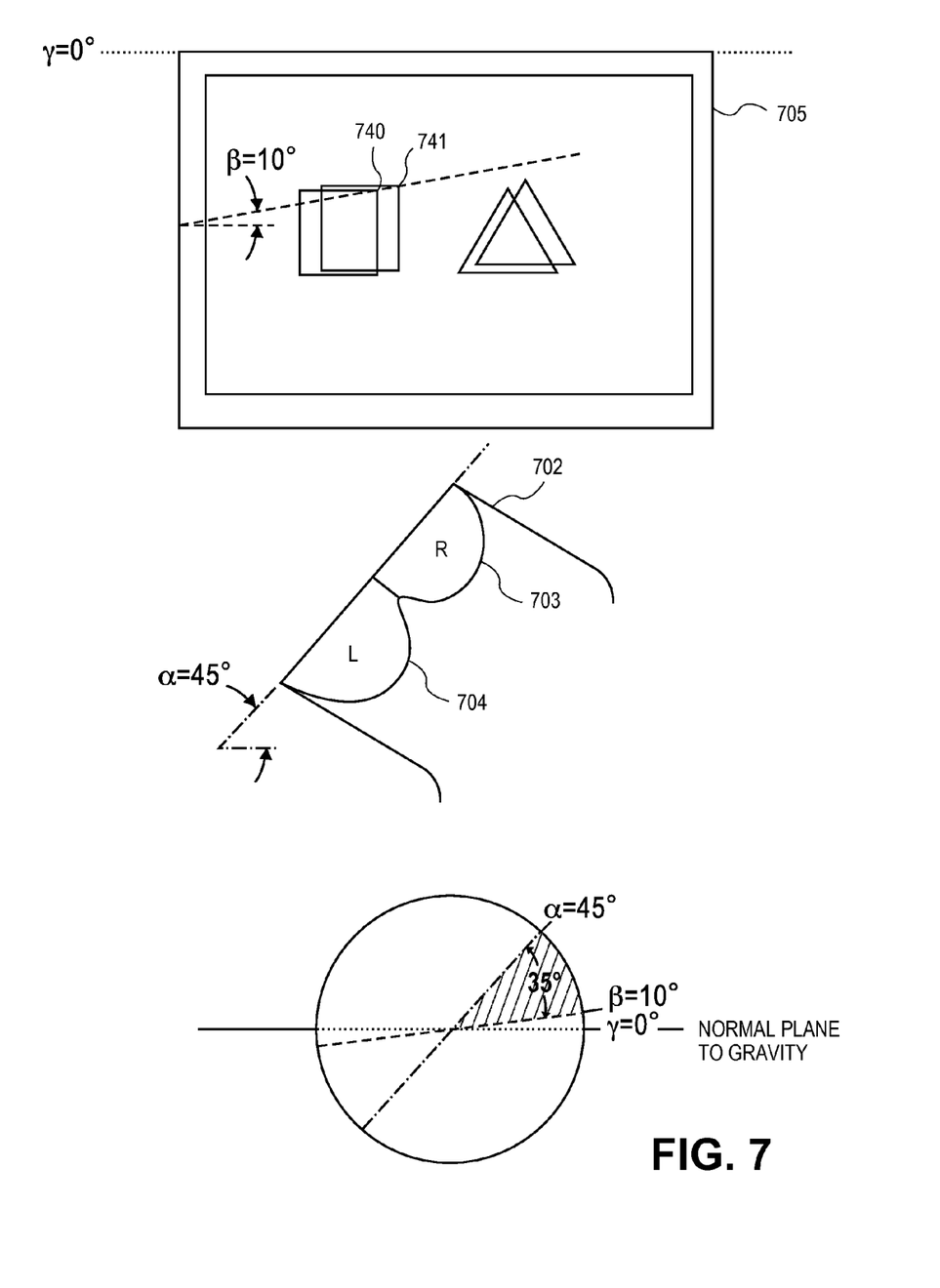
FIG. 7 illustrates rotated 3D glasses watching rotated left eye and right eye images on a display in accordance with an embodiment.

FIG. 7 illustrates rotated 3D glasses watching rotated left eye and right eye images on a display in accordance with an embodiment.

Display 705 shows left eye and right eye images of shapes. Square 740 is shown in the right eye image, and square 741 is shown in the left eye image. The left and right eye images are rotated with respect to each other by angle β, which is 10° in the figure. This can be useful in some contexts such as those described in previously mentioned International Patent Application No. PCT/US2010/045078.

3D glasses 702, with lens 703 and 704, are rotated at roll angle a from horizontal. In the figure, the roll angle equals 45°. The wearer of the glasses may be reclined on a couch, leaning off to one side in a chair, etc.

Display 705 is aligned up and down, such that it can be said that its roll angle, γ, is 0°. This reflects a common orientation of televisions and other displays.

As shown in the angle diagram at bottom of the figure, the differential roll angle of the lenses with respect to the orientation of the left eye and right eye images on the display is α−β=45°−10°=35°. Thus, if the threshold that the glasses switch over to synchronized lenses is less than 35°, then the glasses in the figure will switch over to synchronized lenses.

Figure 8:
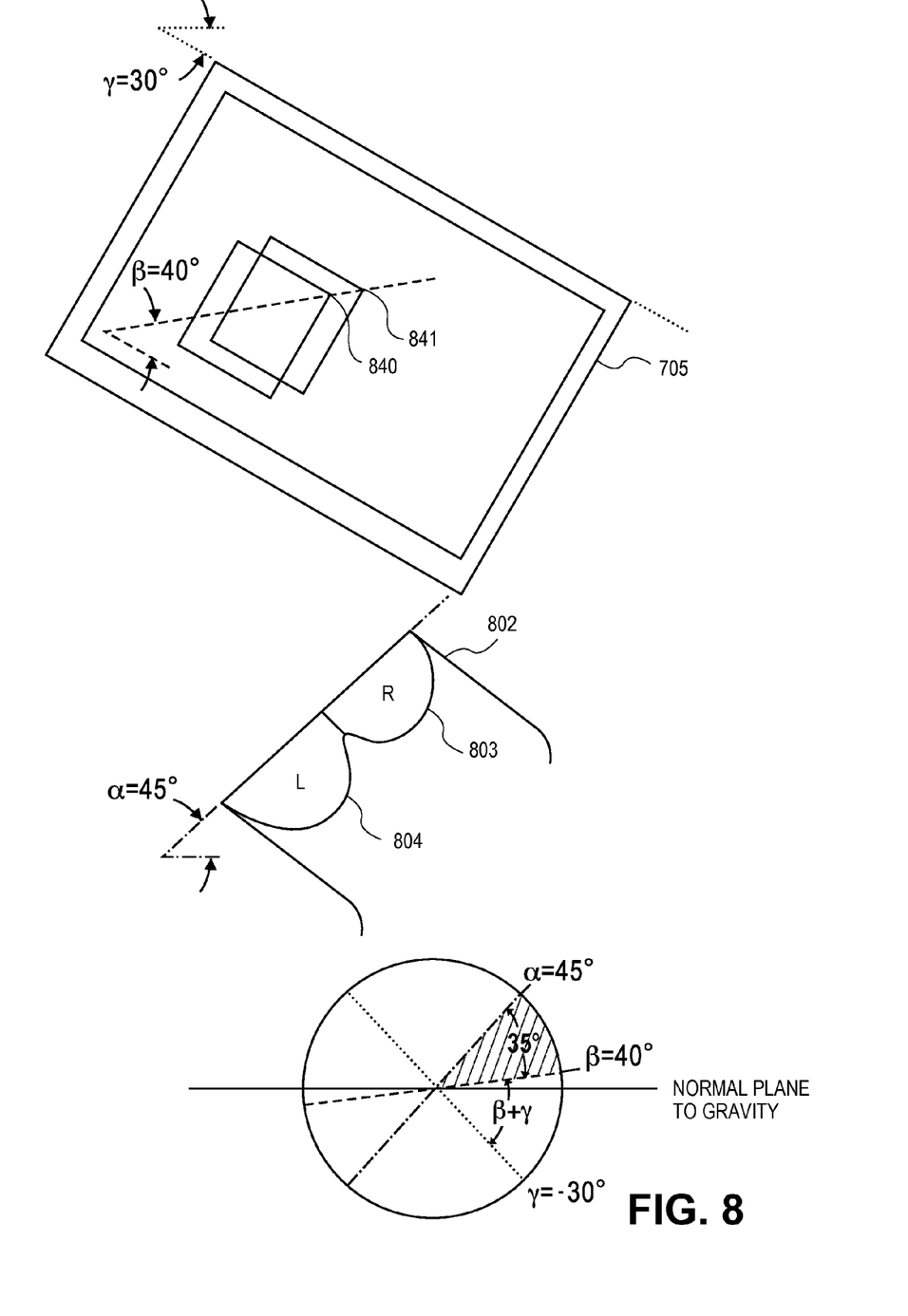
FIG. 8 illustrates rotated 3D glasses watching rotated left eye and right eye images on a rotated display in accordance with an embodiment.

FIG. 8 illustrates rotated 3D glasses watching rotated left eye and right eye images on a rotated display in accordance with an embodiment.

Display 705 shows rectangle 840 as the right eye image and rectangle 841 as the left eye image. The left and right eye images are rotated with respect to each other by angle β, which is 40° in the figure.

3D glasses 802, with lenses 803 and 804, are rotated at roll angle α from horizontal. In the figure, this equals 45°. Again, the wearer of the glasses may be reclined on a couch, leaning off to one side, etc.

Display 705 is tilted to one side. Its roll angle, γ, is −30° with respect to the ground. This can occur in amusement park rides, fancy store displays, and other dynamic or static situations.

As shown in the angle diagram at bottom of the figure, the differential roll angle of the lenses with respect to the orientation of the left eye and right eye images on the display is α−(β+γ)=45°−(40°+−30°)=35°. Thus, similar to the example in the previous figure, if the threshold that the glasses switch over to synchronized lenses is less than 35°, then the glasses in the figure will switch over to synchronized lenses.

Note that the angle that matters most in determining whether the 3D effect of the glasses should be switched off is the differential angle between the lenses of the glasses and the left eye and right eye images on the display. In static situations, where the display and glasses are still, the direction of gravitational force can be used as a datum. That is, measurements can be made of the roll angle of the glasses with respect to gravity (e.g., by using an inclinometer), and a roll angle of the display with respect to gravity, and the two measurements can be subtracted in order to mathematically cancel out the direction of gravity. The measurement at the display can be transmitted by a radio frequency (RF) or infrared (IR) transmitter to the glasses, and a circuit in the glasses can perform the calculation. However, in kinematic environments, such as within a moving vehicle where the direction of gravity is sometimes difficult to measure because of centripetal accelerations, a more direct approach at measuring the differential angle may be more efficient.

Figure 9:
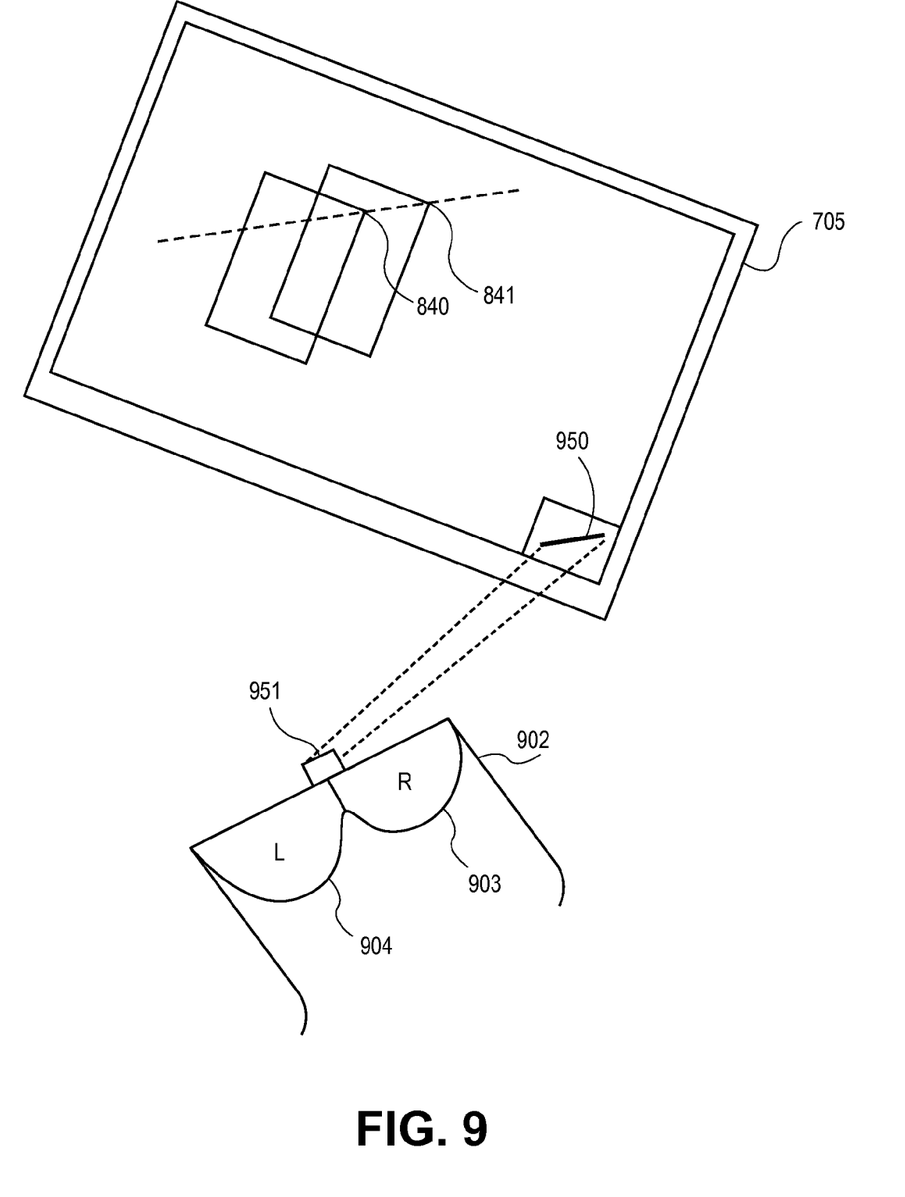
FIG. 9 illustrates a camera on 3D glasses detecting a line on a rotated display in accordance with an embodiment.

FIG. 9 illustrates a camera on 3D glasses detecting a line on a rotated display in accordance with an embodiment. Display 705 shows right eye image rectangle 840 and left eye image rectangle 841 as in the preceding figure. 3D glasses 902, with lenses 903 and 904, are canted the same as in the previous figure. However, display 705 shows line 950 on the display. This line, which connects two end points, represents the angle of the left and right eye images with respect to each other.

Camera 951, which is aligned with the lenses, detects line 950 and compares it to its own orientation. The comparison results in a direct measurement of the differential angle between the left and right eye images on the display and the lenses of the glasses. In this way, jostling about in a vehicle and resulting G's will not adversely affect a determination of whether to turn off 3D in the glasses.

In some embodiments, if the left and right eye images on the display are aligned horizontally with respect to the display, a camera can detect the orientation of the trapezoid/rectangle of the display itself. If the rectangle outline of the display is straight up and down as viewed by the camera, then the 3D glasses and display are aligned at zero degrees. As the glasses are titled, the rectangle is tilted as viewed by the camera.

Figure 10:
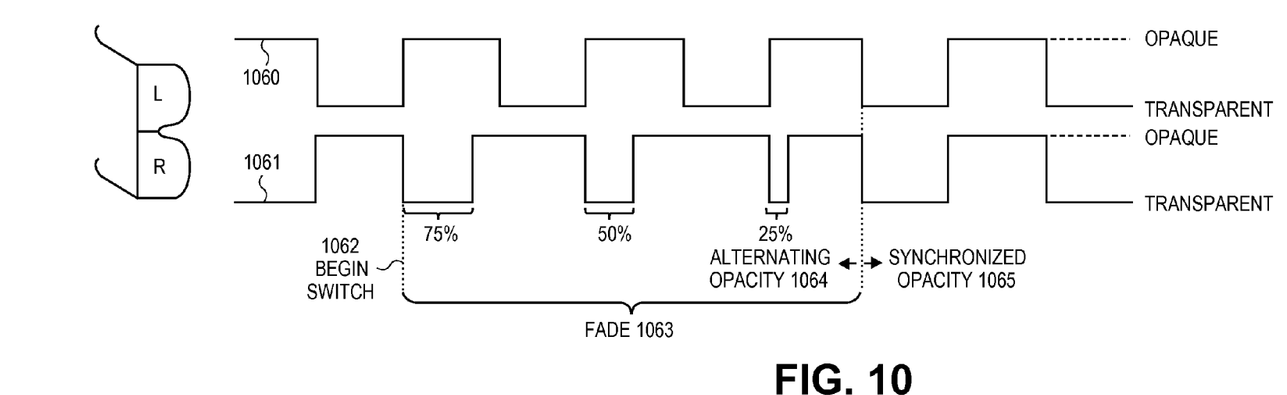
FIG. 10 is a timing diagram illustrating duty cycle fading in accordance with an embodiment.

FIG. 10 is a timing diagram illustrating duty cycle fading in accordance with an embodiment. "Fade logic," including a programmed electrical circuit, can implement the described timing, as would be apparent to one skilled in the art. Voltage 1060 is applied to the left lens of active shutter 3D glasses, and voltage 1061 is applied to the right lens. Opposite left/right patterns can be applied. As is typical with LCD lenses, applying a 'high' voltage results in the crystals aligning and blocking light. Accordingly in the figure, a high state is one in which the respective lens is opaque.

Before the switch, the two signals to the lenses alternate in voltage. While the left lens's voltage is high, the right lens's voltage is low, and vice versa. After a threshold roll angle is crossed, the glasses begin to switch modes at time 1062. During fade period 1063, the duty cycle of the lens to be switched is increased such that its off time is reduced to 75%, then 50%, then 25% of its former periods. The longer duty cycles result in the lens, here the right lens, being opaque for longer periods of time. This lasts until a point where the alternating opacity 1064 becomes synchronized opacity 1065. During synchronized opacity 1065, the two signals of the lenses are synchronized. While the left lens's voltage is high, the right lens's voltage is also high. When one is low, the other is low.

Figure 11:
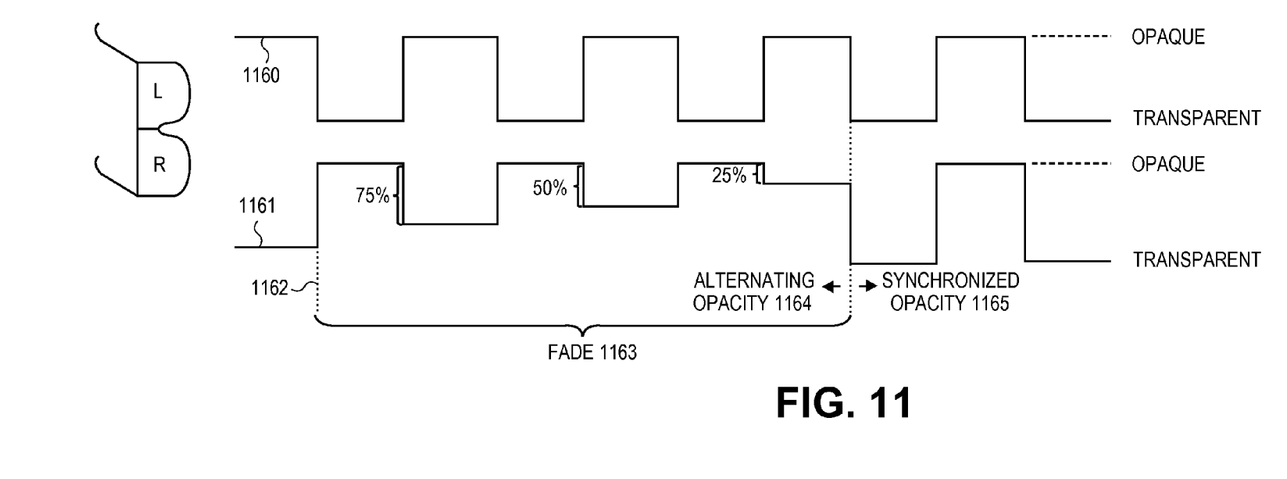
FIG. 11 is a timing diagram illustrating reduced-transparency fading in accordance with an embodiment.

FIG. 11 is a timing diagram illustrating reduced transparency fading in accordance with an embodiment. Voltages 1160 and 1161 are applied to the left and right lenses, respectively.

Before the switch, the two signals to the lenses alternate in voltage. After a threshold roll angle is crossed, the glasses begin to switch modes at time 1162. During fade period 1163, the transparency of the lens is reduced by not allowing the voltage for each lens to go all the way back to zero. That is, some residual voltage aligns some of the LCD crystals but not all of them. The reduced transparency results in the lens, here the right lens, losing transparency over the course of several cycles. This lasts until a point where the alternating opacity 1164 becomes synchronized opacity 1165. During synchronized opacity 1165, the two signals of the lenses are synchronized.

A timer or de-bounce circuit can be included in a control circuit for the lenses. If the lenses are rolled past a threshold angle, then the timer begins. If the lenses roll back only after a moment before the timer expires, then switchover is prevented. However, if the lenses stay rolled past the threshold angle after the timer expires, then switchover from alternating lenses to synchronized lenses is begun.

Figure 12:
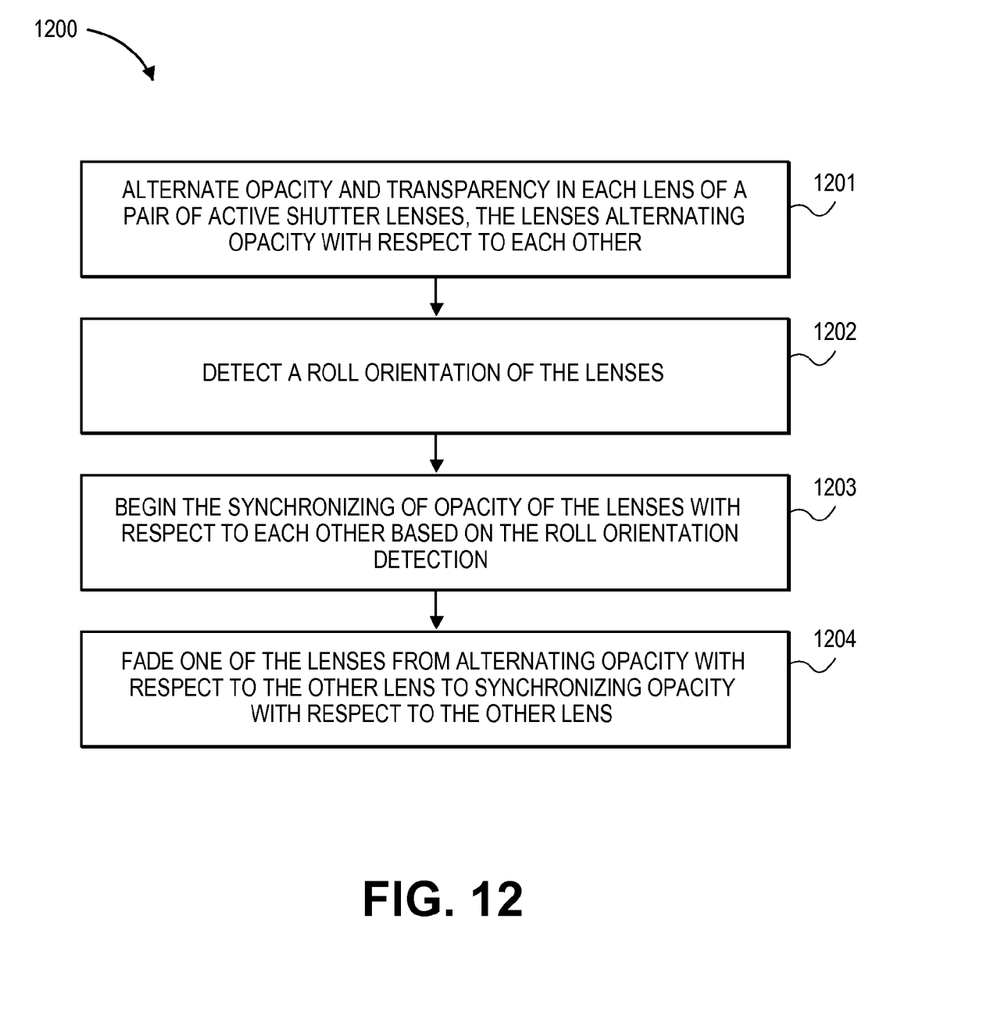
FIG. 12 is a flowchart of a process in accordance with an embodiment.

FIG. 12 is a flowchart of a process in accordance with an embodiment. In operation 1201, opacity and transparency in each lens of a pair of active shutter lenses are alternated with respect to each other. In operation 1202, a roll orientation of the lenses is detected. In operation 1203, the synchronizing of opacity of the lenses with respect to each other is begun based on the roll orientation detection. In operation 1204, one of the lenses is faded from alternating opacity with respect to the other lens to synchronizing opacity with respect to the other lens.

The operations may be performed in the sequence given above or in different orders as applicable. They can be automated in a computer or other machine and can be coded in software, firmware, or hard coded as machine-readable instructions and run through one or more processors that can implement the instructions.

Figure 13:
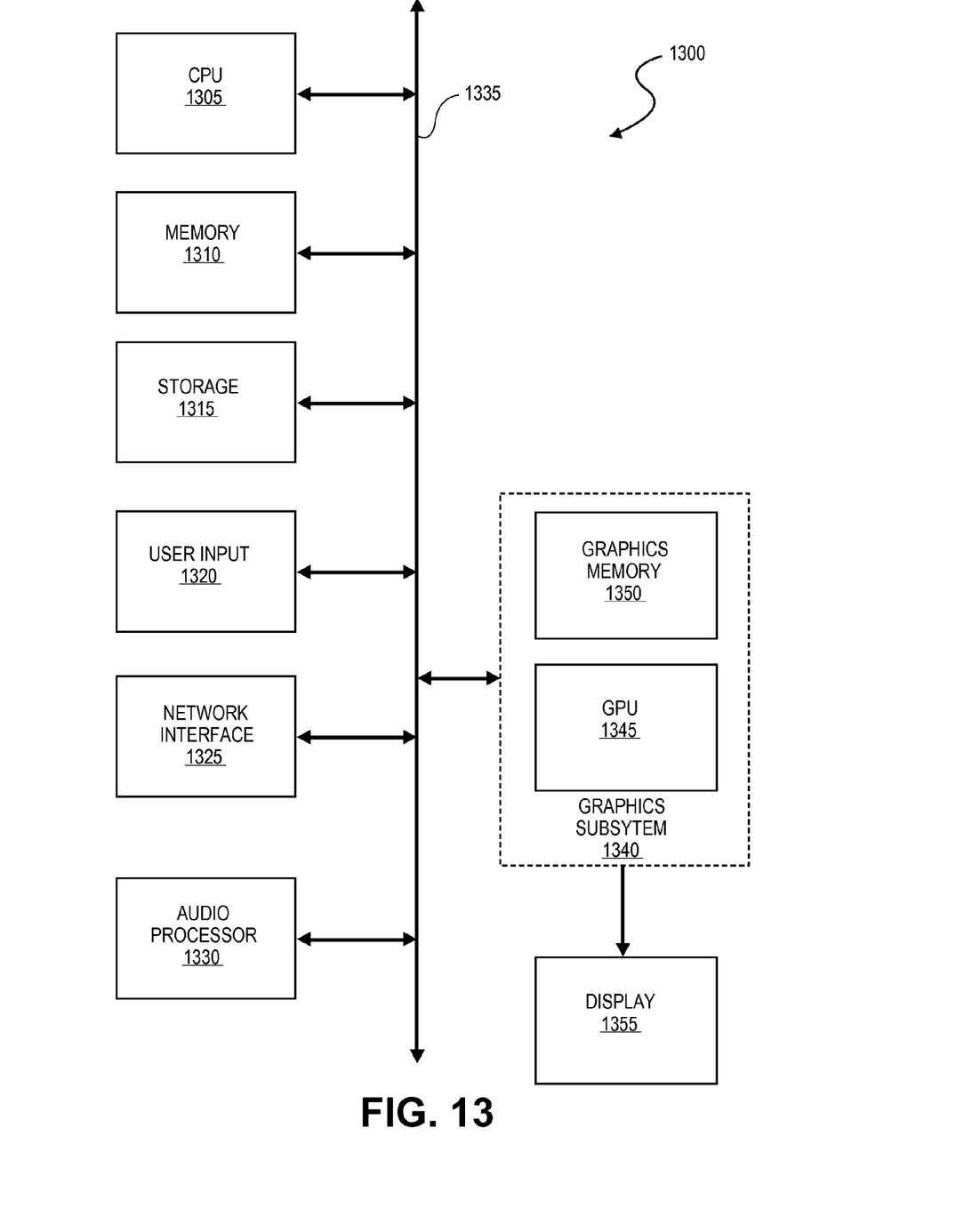
FIG. 13 illustrates a computer system suitable for implementing an embodiment.

FIG. 13 illustrates an example of a hardware system suitable for implementing a device in accordance with various embodiments. This block diagram illustrates a computer system 1300, such as a personal computer, video game console and associated display, mobile device, personal digital assistant, or other digital device, suitable for practicing embodiments of the invention. Computer system 1300 includes a central processing unit (CPU) 1305 for running software applications and optionally an operating system. CPU 1305 may be made up of one or more homogeneous or heterogeneous processing cores. Memory 1310 stores applications and data for use by the CPU 1305. Storage 1315 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1320 communicate user inputs from one or more users to the computer system 1300, examples of which may include keyboards, mice, joysticks, touch pads, touch screens, still or video cameras, and/or microphones. Network interface 1325 allows computer system 1300 to communicate with other computer systems via an electronic communications network, and may include wired or wireless communication over local area networks and wide area networks such as the Internet. An audio processor 1330 is adapted to generate analog or digital audio output from instructions and/or data provided by the CPU 1305, memory 1310, and/or storage 1315. The components of computer system 1300, including CPU 1305, memory 1310, data storage 1315, user input devices 1320, network interface 1325, and audio processor 1330 are connected via one or more data buses 1335.

A graphics subsystem 1340 is further connected with data bus 1335 and the components of the computer system 1300. The graphics subsystem 1340 includes a graphics processing unit (GPU) 1345 and graphics memory 1350. Graphics memory 1350 includes a display memory (e.g., a frame buffer) used for storing pixel data for each pixel of an output image. Graphics memory 1350 can be integrated in the same device as GPU 1345, connected as a separate device with GPU 1345, and/or implemented within memory 1310. Pixel data can be provided to graphics memory 1350 directly from the CPU 1305. Alternatively, CPU 1305 provides the GPU 1345 with data and/or instructions defining the desired output images, from which the GPU 1345 generates the pixel data of one or more output images. The data and/or instructions defining the desired output images can be stored in memory 1310 and/or graphics memory 1350. In an embodiment, the GPU 1345 includes 3D rendering capabilities for generating pixel data for output images from instructions and data defining the geometry, lighting, shading, texturing, motion, and/or camera parameters for a scene. The GPU 1345 can further include one or more programmable execution units capable of executing shader programs.

The graphics subsystem 1340 periodically outputs pixel data for an image from graphics memory 1350 to be displayed on display device 1355. Display device 1355 can be any device capable of displaying visual information in response to a signal from the computer system 1300, including CRT, LCD, plasma, and OLED displays. Any such displays can be 3D capable as known in the art. Computer system 1300 can provide the display device 1355 with an analog or digital signal.

In accordance with various embodiments, CPU 1305 is one or more general-purpose microprocessors having one or more processing cores. Further embodiments can be implemented using one or more CPUs 1305 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An apparatus for viewing a stereoscopic display, comprising:
a pair of active shutter lenses, each lens enabled to alternate opacity and transparency to allow a transmission of a first set of images directed to a first eye through a first lens and transmission of a second set of images directed to a second eye through a second lens;
a roll orientation sensor for detecting a roll orientation of the lenses; and
a circuit connected with the active shutter lenses, the circuit configured to switch the lenses from alternating opacity with respect to each other to synchronizing opacity with respect to each other based at least in part on a signal from the sensor to allow transmission of the first set of images through the first lens and second lens while blocking transmission of the second set of images by the first lens and second lens, the signal indicating exceeding a threshold based at least in part on roll orientation, wherein the circuit is configured to delay switching the lenses between opacity and synchronization for a period of time to confirm that the threshold is exceeded.

2. The apparatus of claim 1 further comprising:
fade logic configured to fade one of the lenses from alternating opacity with respect to the other lens to synchronizing opacity with respect to the other lens.

3. The apparatus of claim 2 wherein the fade logic shortens a duty cycle of the faded lens during fading.

4. The apparatus of claim 2 wherein the fade logic reduces a maximum transparency of the faded lens during fading.

5. The apparatus of claim 1 further comprising:
an indicator configured to activate upon switching the lenses from alternating opacity with respect to each other to synchronizing opacity with respect to each other, the indicator selected from the group consisting of an audio speaker, a light, and a vibration motor.

6. The apparatus of claim 1 wherein the sensor is configured to send the signal based on a predetermined roll angle.

7. The apparatus of claim 1 wherein the sensor is selected from the group consisting of an accelerometer, a mercury switch, and an inclinometer.

8. The apparatus of claim 1 further comprising:
a selector operatively coupled with the circuit, the selector configured to select between two or more roll angles at which the circuit is configured to switch the lenses from an alternating opacity with respect to each other to synchronizing opacity with respect to each other.

9. The apparatus of claim 8 wherein the selector is user selectable.

10. The apparatus of claim 8 wherein the selector includes means for inferring an age of a wearer.

11. The apparatus of claim 1 further comprising:
a timer operatively coupled with the circuit, wherein the timer is configured to delay a switch from alternating to synchronized opacity to confirm that the roll angle is exceeded.

12. A system for viewing a stereoscopic display, comprising:
a pair of active shutter lenses comprising a first lens and second lens, each lens enabled to alternate opacity and transparency;
a detection system for detecting a differential roll angle of the lenses with respect to an orientation of left eye and right eye images on a display; and
a circuit connected to the active shutter lenses, the circuit configured to switch the lenses from alternating opacity with respect to each other to synchronizing opacity with respect to each other based on a signal from the detection system to allow transmission of either a set of left eye images or a set of right eye images through the active shutter lenses, the synchronizing opacity blocking the right eye images by the first lens and second lens when transmitting the set of left eye images or blocking the left eye images by the first lens and second lens when transmitting the set of right eye images, the signal indicating exceeding a threshold based at least in part on roll orientation, wherein the circuit is configured to delay switching the lenses between opacity and synchronization for a period of time to confirm that the roll angle is exceeded.

13. The system of claim 12 further comprising:
a circuit configured to be coupled with a display, the circuit configured to shut down 3D on the display by displaying only left eye or right eye images, the shutting down based on receiving a signal from the system for detecting a roll angle of the lenses with respect to an orientation of left eye and right eye images on the display.

14. The system of claim 12 wherein the system for detecting the roll angle comprises:
- a sensor for detecting a roll orientation of the lenses with respect to gravity;
- a transmitter configured to transmit a signal representing a roll orientation of the left eye and right eye images on the display with respect to gravity; and
- a receiver configured to receive the signal, the receiver operatively connected with the circuit,
- wherein the circuit is configured to determine the differential roll angle by determining a difference between the roll orientation of the lenses with respect to gravity and the received roll orientation of the left eye and right eye images on the display with respect to gravity, thereby cancelling out a direction of gravity.

15. The system of claim 14 wherein the transmitter and receiver communicate via radio frequency (RF) or infrared (IR) signals.

16. The system of claim 12 wherein the system for detecting the roll angle comprises:
- a camera rigidly coupled with the pair of lenses, the camera configured to detect an orientation of points displayed on a display, the points indicating the orientation of the images.

17. The system of claim 12 wherein the system for detecting the roll angle comprises:
- a camera rigidly coupled with the pair of lenses, the camera configured to detect an orientation of a rectangular image of the display.

18. A method for viewing a stereoscopic display, the method comprising:
- alternating opacity and transparency in each lens of a pair of active shutter lenses, the lenses alternating opacity with respect to each other to allow a transmission of a first set of images directed to a first eye through a first lens and transmission of a second set of images directed to a second eye through a second lens;
- detecting a roll orientation of the lenses;
- synchronizing opacity of the lenses with respect to each other based at least in part on the roll orientation detection to allow transmission of the first set of images through the first lens and second lens while blocking transmission of the second set of images by the first lens and second lens, the signal indicating exceeding a threshold based at least in part on roll orientation; and
- delaying the synchronization for a predetermined time.

19. The method of claim 18 further comprising:
- fading one of the lenses from alternating opacity with respect to the other lens to synchronizing opacity with respect to the other lens.

20. The method of claim 18, further comprising:
- detecting an orientation of points displayed on the display, the points indicating the orientation of the images.

* * * * *